United States Patent [19]
Auracher

[11] Patent Number: 5,392,377
[45] Date of Patent: Feb. 21, 1995

[54] OPTICAL TRANSMISSION SYSTEM FOR TRANSMISSION OF SIGNALS WITH A CONTINUOUS APPLICATION OF THE SIGNALS DURING TRANSMISSION

[75] Inventor: Franz Auracher, Baierbrunn, Germany

[73] Assignee: Siemens Aktiengesellschaft, Munich, Germany

[21] Appl. No.: 120,809

[22] Filed: Sep. 15, 1993

[30] Foreign Application Priority Data

Sep. 30, 1992 [DE] Germany .................. 4232877.2

[51] Int. Cl.[6] .............................................. G02B 6/28
[52] U.S. Cl. .................... 385/24; 359/179; 385/27; 372/4
[58] Field of Search ............... 385/24, 27, 48, 141; 370/1, 4, 6; 359/160, 333, 341, 127, 134, 160, 179, 180, 334

[56] References Cited

U.S. PATENT DOCUMENTS

| | | | |
|---|---|---|---|
| 4,726,644 | 2/1988 | Mathis | 385/24 |
| 4,790,619 | 12/1988 | Lines et al. | 385/24 |
| 5,005,936 | 4/1991 | Hsu | 385/24 |
| 5,058,976 | 10/1991 | DiGiovanni et al. | 385/24 X |
| 5,185,814 | 2/1993 | Healey | 385/24 |
| 5,185,826 | 2/1993 | Delavaux | 385/24 |

FOREIGN PATENT DOCUMENTS

| | | |
|---|---|---|
| 0387075 | 9/1990 | European Pat. Off. |
| 0421675 | 4/1991 | European Pat. Off. |
| 0485101 | 5/1992 | European Pat. Off. |

OTHER PUBLICATIONS

Giles et al, "Propagation of Signal and Noise in Concatenated Erbium-Doped Fiber Optical Amplifiers", *Journal of Lightwave Technology*, vol. 9, No. 2, Feb. 1991, pp. 147-154.
Cleland et al, "Limitations of WDM Transmission Over 560 km Due to Degenerate Four Wave Mixing", *Electronics Letters*, 30 Jan. 1993, vol. 29, No. 3, pp. 307-309.
Izadpanah et al, "Dispersion Compensation in 1310nm-Optimised SMFs Using Optical Equaliser Fibre, EDFAs and 1310/1550nm WDM", *Electronics Letters*, 16th Jul. 1992, vol. 28, No. 15, pp. 1469-1471.
Dietrich Marcuse, "Single-Channel Operation in Very Long Nonlinear Fibers with Optical Amplifiers at Zero Dispersion", *Journal of Lightwave Technology*, vol. 9, No. 3, Mar. 1991, pp. 356-361.
Chraplyvy, "Limitations on Lightwave Communications Imposed by Optical-Fiber Nonlinearities", *Journal of Lightwave Technology*, vol. 8, No. 10, Oct. 1990, pp. 1548-1557.
Nakazawa et al, "10 Gbit/s–1200 km single-pass soliton data transmission using erbium-doped fiber amplifiers", Post Deadline Paper, PD11, OFC '92, 2-7 Feb. 1992, San Jose, Calif., pp. 355-358.
Poole et al, "Broad-band Dispersion Compensation Using the Higher-order", Post Deadline Paper PD 13, OFC '92, Feb. 2-7, 1992, San Jose, Calif., pp. 363-366.
Dugan et al, "All-Optical, Fiber-Based 1550 nm Dispersion Compensation in a 10 Gbit/s, 150 km Transmission Experiment over 1310 nm Optimized Fiber", Post Deadline Paper PD 14, OCF '92, Feb. 2-7, 1992, San Jose, Calif., pp. 367-370.

*Primary Examiner*—Akm E. Ullah
*Attorney, Agent, or Firm*—Hill, Steadman & Simpson

[57] ABSTRACT

An optical transmission system for the transmission of optical signals in a wave-division multiplex on a plurality of neighboring optical carrier wavelengths is characterized by the fiber being doped to form a continuously distributed waveguide amplifier over the entire length of the transmission waveguide. To pump the waveguide amplifier, which is continuously distributed along the transmission waveguide, several arrangements are provided. This system can be operated as a unidirectional system or a bidirectional system.

16 Claims, 3 Drawing Sheets

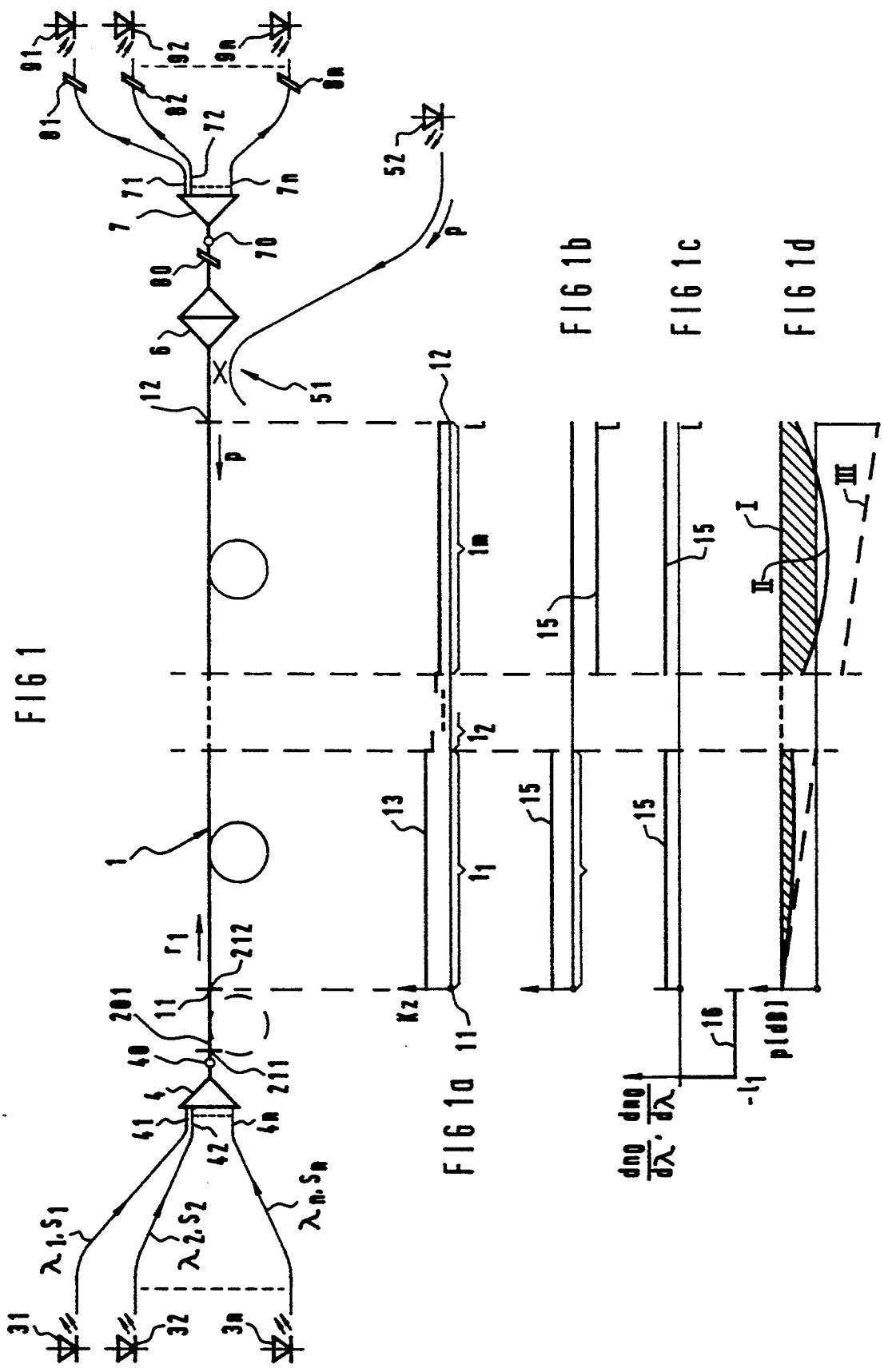

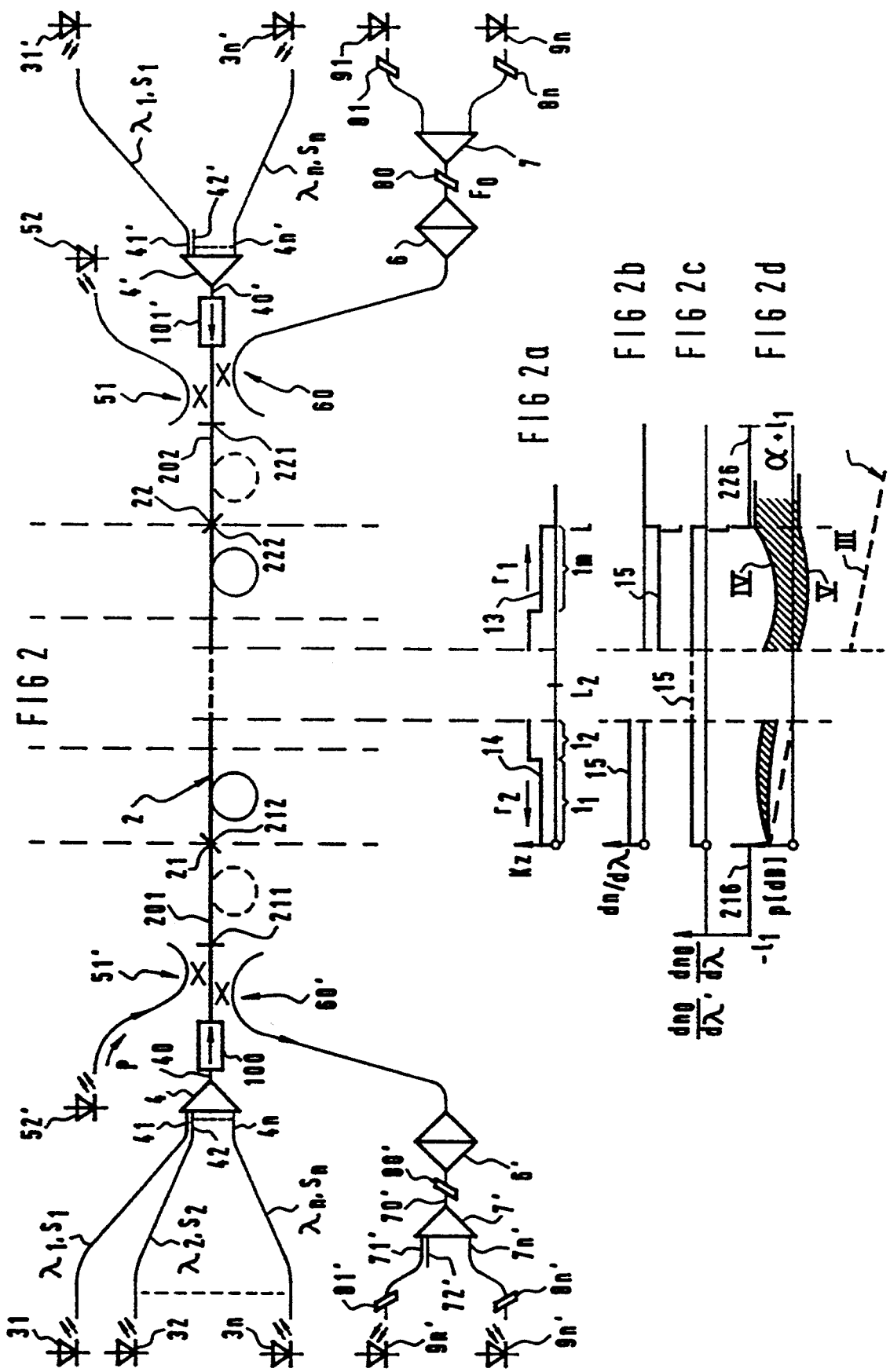

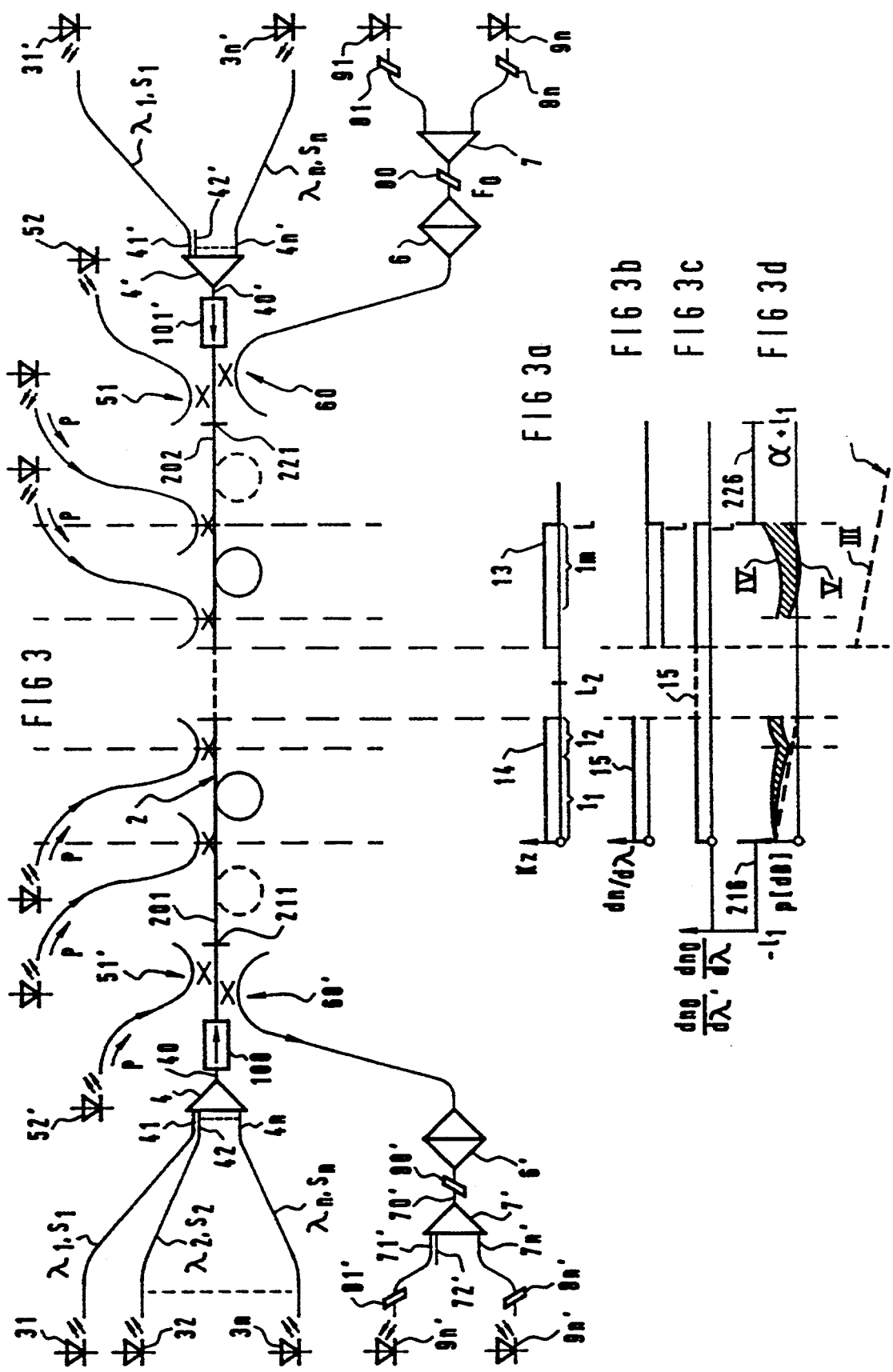

OPTICAL TRANSMISSION SYSTEM FOR TRANSMISSION OF SIGNALS WITH A CONTINUOUS APPLICATION OF THE SIGNALS DURING TRANSMISSION

BACKGROUND OF THE INVENTION

There is a general desire in optical transmission links to increase the performance capability of the transmission link, for example the data throughput in the transmission.

Optical fibers are particularly available for high-capacity, line bound transmission links. It is known that the regions of low attenuation in these fibers at the optical wavelength 1.3 $\mu$m and 1.55 $\mu$m, which are referred to as the optical windows, together correspond to a transmission band width of more than 30,000 GHz. The desire is to make the optimally large part of this band width employable or usable.

Various methods are known for increasing the performance capabilities of a transmission link.

The data throughput can first be increased by increasing the data rate by electrical or optical time-division multiplexing of the data signals. On the other hand, a limit thereby occurs with respect to the prevailing data rate in the electronics or, respectively, the optoelectronics, and this limit currently amounts to a maximum of 10 Gbit/s and perhaps in the future a range of 50 through 100 Gbit/s per second. On the other hand, the distance that can be bridged decreases with the increasing data rate due to the decreasing receiver sensitivity or due to an increasing dispersion-caused transit time effects. The first limitation can be largely cancelled by the employment of optical amplifiers or repeaters. The second, however, is more difficult to avoid and an improvement can be achieved by employing specific, low dispersion fibers. The employment of optical solitons for the transmission is significantly more effective, but more involved as well, for example see M. Nakazawa et al "10 Gbits/s-1200 km single pass soliton data transmission using Erbium-doped fiber amplifiers", Post Deadline Paper, PD 11, *OFC '92*, Feb. 2-7, 1992, San Jose, Calif. The dispersion effects are compensated here by non-linear effects on the fiber.

An especially elegant way of enhancing the performance of the transmission link with respect to the data throughput is the optical multi-channel technique in combination with a time-division multiplex technique. The performance capabilities of this technique, however, is limited, particularly by the channel cross-talk due to non-linear effects of the transmission link.

In optical multi-channel technique in the form of an optical wavelength-division multiplex, the optical signals to be transmitted are transmitted on many neighboring, optical carrier wavelengths.

The performance capability of such a transmission system, however, is limited by a number of parameters. These include the use of a part of the optical window, which is particularly limited due to the availability or the variable frequency range of the optical transmitters. The minimum channel or carrier wavelength spacing derived from the selectivity or tuning precision of the available optical receiver, for example, the resolution of a demultiplexer or of an optical given direct reception or of the intermediate frequency filter band with given heterodyne reception, from the band width of the modulated optical data channel as well as on the basis of channel cross-talk due to non-linear effects on the transmission path.

It is precisely the channel cross-talk due to non-linear effects that represents a great restriction in the multi-channel system given small channel spacings and a high number of channels, particularly when the high transmission power must be utilized because great distances are to be bridged with a high data rate per channel. It is particularly the three-wave mixing, which is often referred to as a four-wave mixing, and the raman scatter that dominates the non-linear interaction in multi-channel systems. A detailed calculation of the influence of these effects on transmission systems with optical heterodyne reception can be found, for example, in an article by Andrew R. Chraplyvy, "Limitations on Light-Wave Communications Imposed by Optical-Fiber Non-linearities", *J. Lightwave Techn.*, Vol. 8 (1990), pages 1548–1557.

SUMMARY OF THE INVENTION

The object of the present invention is to optimize an optical transmission system for the transmission of optical signals in a wavelength-division multiplex on a plurality of neighboring, optical carrier wavelengths, particularly over at least 40 km distance so that the performance limit caused by non-linear effects with respect to the data throughput can be shifted upward as far as possible.

The system of the present invention even makes it advantageously possible to avoid the limitations due to non-linear effects to the farthest-reaching extent as a result wherein the performance capabilities of this transmission system can be enhanced as far as possible.

The invention includes the improvement in an optical transmission system for the transmission of optical signals in wavelength-division multiplex on a plurality of neighboring optical carrier wavelengths over a distance of more than 100 km comprising a transmission waveguide for the transmission of the optical signals and an optical waveguide amplifier for raising or increasing a signal level of the optical signals transmitted on the transmission waveguide that drops off along the transmission waveguide due to attenuation, with the improvements being that the optical waveguide amplifier is continuously distributed essentially over the entire length of the transmission waveguide.

The invention is based on the following independent considerations or perceptions:

The optical power at the receive side end of the transmission link must at least correspond to the sensitivity of the receiver. If an ideal, loss-free, non-noise-infested transmission were available, then the same low power would also be adequate at the transmitter-side end of the transmission link.

Since the non-linear effects increase greatly with the power in the transmission fiber, for example with the third power given three-wave mixing, no problems with channel cross-talk due to these effects would be anticipated given these low power levels, even given high numbers of channels in great lengths. However, in the real case, the optical fibers have attenuation values of 0.2 dB/km through 0.5 dB/km so that the optical power to be coupled into the link at the transmitter end must be correspondingly greater given long transmission links. In a multi-channel system having very closely adjacent channels or, respectively, carrier wavelengths and great link lengths, these lead to cross-talk due to the non-linear effects.

When the Raman scatter dominates, this being the case given an extremely high number of channels, then the fiber link is to cascade such that an optimally uniform, low power level is achieved along the entire link. When, by contrast, three-wave mixing contributes more to the channel cross-talk (up to a number of channels approximately 300 according to the above-mentioned article by Chraplyvy from *J. Lightwave Techn.*, pp. 1548–1557), then disturbing, non-linear effects can be kept low by employing a fiber having a comparatively high dispersion.. With respect to the non-linear disturbances, the transmission link then behaves as though it only had a length of two to three times the effective interaction length $L_{eff}$, which is reference $L_e$ in the above-mentioned article. Whereby the effective length $L_{eff}$ becomes shorter given increased fiber dispersion and typically lies at 8 km through 17 km.

Consequently, a transmission link for transmitting optical signals in the wavelength-division multiplex on a plurality of neighboring, optical carrier wavelengths is to be optimized so that the power level in the region having greater non-linear interactions must be as low as possible or the interaction lengths themselves must be minimized, whereas the overall attenuation of the link must .be reduced by optical amplification.

When the effective interaction length $L_{eff}$ of the non-linear effect is great in comparison to the transmission link, for example given extremely low fiber dispersions or when the Raman scatter dominates, it has been recognized that the most beneficial solution is a transmission medium in the form of a lightly doped optical fiber that is optically pumped so that an optical signal level transmitted along the transmission link remains as constant as possible or at least exhibits a reduced drop-off in comparison to the unpumped fiber.

A preferred development of the system is that the transmission waveguide is composed of a waveguide doped with a dopant for achieving an optical amplification in a transmission waveguide that can be excited by optical pumping with a pumping emission, the pump emission which is capable of being coupled into the waveguide. Preferably, the product of the concentration of the dopant and the pump power density of the pump emissions infed into the transmission waveguide and guided in the waveguide is essentially constant along the transmission waveguide. The concentration of the doping can comprise either a continuous or step-shaped drop in the transmission direction of the optical signals guided in the transmission waveguide and the pump emission in the region of this drop-off is guided in a transmission waveguide opposite this transmission direction. When the pump emission is guided in the transmission waveguide opposite to the transmission direction, the demand for optimally constant and low signal power along the transmission waveguide can be achieved at least in a first approximation in that the pump admission is guided opposite the direction of the profile drop in the fiber. What can thereby be achieved is that the drop of the optical amplification along the waveguide due to the power of the pump emission becoming lower as a consequence of fiber attenuation can be cancelled or alleviated by a corresponding increase in the concentration of the dopant so that the optical amplification remains essentially constant along the waveguide or at least have a reduced drop-off in comparison to the unpumped waveguide. What this affects is that the signal level of the optical signals remains constant along the waveguide or at least has a reduced drop-off in comparison to the unpumped waveguide.

The system can be a unidirectional transmission of optical signals which is characterized in that the concentration of the dopant drops either continuously or in steps from one end of the transmission waveguide for the infeed of the optical signals into the waveguide along the waveguide up to an opposite end of the waveguide for the outfeed of the infed signals that are guided through the waveguide and in that the pump emission is fed into the waveguide through the opposite end for the outfeed of the optical signals and is guided through the waveguide to the one end for the infeed of the optical signals.

The system of the preferred structure is also useful wherein the pump emission is not coupled in at one end of the waveguide but at another point, for example in a longitudinal axial middle of the waveguide. When the pump power is coupled in at the middle of the fiber, it is expedient when the infed pump power propagates in opposite directions in the waveguide proceeding from the middle. It is expedient in this case when the profile of the concentration of the pump in each waveguide half has a drop-off toward the middle of the waveguide. The waveguide having such an infeed of the pump emission and such a profile of the dopant concentration is also suitable for bidirectionally operated transmission links so that this profile should expediently be mirror-symmetrical with respect to the middle of the fiber.

A system having end-side infeed of the pump emission that is suitable for a bidirectionally operated transmission link is characterized in that the concentration of the dopant increases continuously or in steps from one end of the fiber for the infeed and outfeed of the optical signals up to the middle of the transmission waveguide and decreases continuously or in steps from the middle to the opposite end for the outfeed and infeed of the optical signals and in that the pump emission can be coupled into the waveguide both via the one end as well as via the opposite end and is guided in the fiber in opposite directions. Thus, it is also expedient here, as it is generally expedient in bidirectional transmission, when the profile of the concentration of the dopant is symmetrical with respect to the middle of the waveguide.

Not least of all for manufacture-oriented reasons, it is advantageous to employ a step-shaped profile of the concentration of the dopant and to employ a separate waveguide section with constant concentration of the dopant for every step so that these waveguide sections, preferably fiber sections, are coupled to one another for forming the overall waveguide.

Alternative, preferred advantageous developments of the system of the invention may have the pump emission being laterally coupled into the waveguide with constant or locally-varying coupling degrees over essentially the entire length of the transmission waveguide. The pump emission can be guided in an undoped waveguide that is conducted along the transmission waveguide and is optically coupled to this waveguide. The concentration of the dopant is constant in the transmission waveguide and the coupling of the undoped waveguide to the doped transmission waveguide varies such that along the doped waveguide, the pump power of the pump emission coupled into the doped waveguide is constant in this doped waveguide.

When the three-wave mixing is considerable or dominant in the system of the present invention, it is expedient for minimizing the three-wave mixing to employ a transmission waveguide having relatively high dispersion in combination with a relatively short compensation waveguide. The compensation waveguide will have a dispersion ($dn_1/d\lambda$) having an operational sign that is opposite in comparison to the dispersion ($dn_0/d\lambda$) of the transmission waveguide and is pre-connected to the end of the fiber for the infeed of optical signals wherein the length of the compensation waveguide is shorter in comparison to the length of the transmission waveguide and the dispersion ($dn_1/d\lambda$) with the opposite operational sign of the compensation waveguide are selected so that the overall dispersion of the transmission waveguide and the compensation waveguide is lower than the dispersion $dn_0/d\lambda$ of the transmission waveguide. The overall dispersion of the transmission link can be kept adequately low with such a compensation waveguide, preferably an optical compensation fiber. Thus, the transmission waveguide itself should have an optimally high dispersion in order to keep the effective interaction length of the three-wave mixing short.

Let it be pointed out that the superpositioning of such a compensation waveguide for compensating the dispersion in the traditional, undoped waveguides that do not act as optical amplifiers, is already known from an article by C. D. Pool et al entitled "Broad band dispersion compensation using higher-order spatial-mode in a two-mode fiber", Post Deadline Paper PD 13, *OFC '92*, Feb. 2-7, 1992, San Jose, Calif.

When the three-wave mixing is considerable or dominates, optical waveguides can be employed which have the transmission waveguide with a dispersion of one operational sign on one half and having a dispersion with an opposite operational sign on the other half. As a result of the measures of the fiber having a dispersion of one sign for half of the length of the fiber and an opposite sign for the remaining half can be obtained by interconnecting two optical fibers having high but opposite dispersions with the effective interaction length $L_{eff}$ and the overall dispersion of the transmission waveguide kept within admissibly low limits.

Optical fibers or optical sections are preferably employed as the optical waveguide, which is used as a transmission waveguide.

The system of the present invention is advantageously applied in combination with an optical heterodyne receiver.

Other advantages and features of the invention will be readily apparent from the following description of the preferred embodiments, the drawings and claims.

BRIEF DESCRIPTION OF THE DRAWINGS

FIG. 1 is a schematic presentation of an exemplary embodiment of an optical transmission system for unidirectional transmission of optical signals on various carrier wavelengths in accordance with the present invention;

FIGS. 1a–1d are graphical presentations of the length of the transmission fiber of the system of FIG. 1, with FIG. 1a being the step-shaped profile of the concentration of the dopant in the fiber; FIG. 1b being the optimum curve of the dispersion in the fiber for minimizing the three-wave mixing, namely a relatively high positive dispersion of the first fiber half-link and a relatively high but negative dispersion of the second half-link or vice versa; FIG. 1c being an alternative of a relatively high dispersion having the same operational sign on the entire link in combination with a compensation fiber with extremely high dispersion and opposite operational sign for compensating the dispersion; and FIG. 1d showing curves of the signal levels of the pumped, doped fiber in comparison to the signal level of the unpumped fiber;

FIG. 2 is a diagrammatical exemplary embodiment of an optical transmission system for bidirectional transmission of optical signals of various carrier wavelengths in accordance with the present invention;

FIGS. 2a–2d are graphical presentations of the length of the exemplary transmission fiber, with FIG. 2a showing the stepped profile of the concentration of the dopant; FIG. 2b being a curve of the dispersion of the fiber similar to that of FIG. 1b; FIG. 2c showing an alternative of the relatively high dispersion over the entire length in combination with the compensation fiber similar to FIG. 1c; and FIG. 2d showing the curves of the signal levels for the pumped, doped fiber in comparison to that of an unpumped fiber;

FIG. 3 is an alternative embodiment of the optical transmission system in accordance with the present invention, wherein doping is constant over the entire length of the system; and FIGS. 3a–3d are graphical presentations for the waveguide of the system of FIG. 3, with FIG. 3a showing the doping; FIGS. 3b and 3c showing the dispersion; and FIG. 3d showing the curves.

DESCRIPTION OF THE PREFERRED EMBODIMENTS

The principles of the present invention are particularly useful when incorporated in the operating transmission system of FIG. 1, which is a unidirectionally operated system.

In the unidirectional operating transmission system of FIG. 1, the optical signals $S_1, S_2, \ldots S_n$ are generated by n, wherein n is an arbitrary, natural whole number, separate optical transmitters 31, 32, ... 3n on different channels or, respectively, carrier wavelengths $\lambda_1, \lambda_2, \ldots \lambda_n$ and are supplied in parallel to n inputs 41, 42, ... 4n of an optical coupler 4, which will bring these signals $S_1, S_2, \ldots S_n$ together as a single output 40. This output can be directly coupled to an input 11 for infeeding these signals $S_1, S_2, \ldots S_n$ to a fiber 1 or, as shown, can be connected thereto by an intervening compensation fiber 201, which will be described later, for minimizing the three-wave mixing.

Since the power level in this fiber 1 is to be kept low and, on the other hand, an optimally high plurality of closely adjacent channels or, respectively, carrier wavelengths $\lambda_1, \lambda_2, \ldots \lambda_n$ having, for example, a channel or, respectively, carrier wavelength spacing of 10 GHz through 50 GHz are to be transmitted, a simple, wavelength-independent optical coupler 4 in the form, for example, of a star coupler on which only one output is used is adequate for the infeed of the signals $S_1, S_2, \ldots S_n$. The insertion loss of such a star coupler is fundamentally at least $L^{dB} = 10 \lg n$.

The optical signals $S_1, S_2, \ldots S_n$ transmitted through the fiber 1 in the transmission direction r1 are coupled out at the opposite end 12 of the fiber 1 for outfeed of these signals $S_1, S_2, \ldots S_n$, which are supplied to an optical distributor 7. The optical distributor 7 outfeeds the signals $S_1, S_2, \ldots S_n$ to n separate optical receivers 91, 92, ... 9n. The distributor 7 comprises one input 70 and n outputs 71, 72, ... 7n, whereof each is connected to exactly one allocated receiver, such as 91, 92 or 9n, respectively.

When a non-wavelength-selective power divider is employed as an optical distributor 7, then, on the one hand, an allocated optical filter 81, 82, ... or 8n, respectively, is arranged between each output 71, 72, ... 7n of the power divider and the optical receiver 91, 92, ... or 9n. This optical filter is transmissive only for the particular optical signals, such as $S_1$, $S_2$, ... or $S_n$ of the particular wavelength, $\lambda_1$, $\lambda_2$, ... or $\lambda_n$ that is allocated to the particular receiver 91, 92, ... or 9n. On the other hand, since an insertion loss of at least $L^{dB} = 10 \lg n$ also appears given this power divider 7, this loss must be compensated by an additional optical amplifier 6 that is preferably arranged between the opposite end 12 of the fiber 1 and the power divider 7.

It is also expedient to arrange an additional filter 80 between the opposite end 12 of the fiber 1 and the distributor 7, for example between the amplifier 6 and the power divider 7. This additional filter 80 is transmissive only for the wavelength range of which the optical signals $S_1$, $S_2$, ... $S_n$ are transmitted. As a result of the filter 80, disturbing wavelengths outside of this wavelength range can be suppressed.

The fiber in the form of an optical fiber is inventively lightly doped with a dopant with which an optical amplification in the fiber 1 can be excited by pumping with a pump emission P. For example, erbium (Er) is suitable as a dopant when the transmission wavelength lies in the 1.5 μm wavelength window and when the 1.3 μm wavelength window is utilized, praseodymium (Pr) is suitable.

The pump emission P is coupled into the doped fiber 1 for pumping and is guided in this fiber 1. What is thereby critical is that the concentration $k_z$ of the dopant that determines the degree of optical amplification in the fiber 1 has such a profile 13 (FIG. 1a) in the fiber over the length L of the fiber that the signal level of the optical signals $S_1$, $S_2$, ... $S_n$, which are infed into the fiber 1, remain constant in the transmission direction $r_1$ upon passage through the pumped fiber 1 or at least has a drop of this signal level p that is diminished in comparison to the unpumped and, thus, not optically amplified fiber 1. What can be achieved, last but not least, by this measure is that the signal level p at the end 11 of the fiber 1 for infeed of the optical signals $S_1$, $S_2$, ... $S_n$ is kept so low that no problems with channel cross-talk due to non-linear effects are to be anticipated even given high channel numbers n and long link lengths, i.e., great lengths L of the fiber 1.

A profile 13 of the concentration $k_z$ of the dopant suitable for this purpose is a profile that has a continuous or stepped drop in the transmission direction $r_1$ of the optical signals $S_1$, $S_2$, ... $S_n$ guided in the fiber 1, whereby the drop occurs opposite the transmission direction of the pump emission in the fiber 1.

In the exemplary embodiment of FIG. 1, there is a step-shaped profile 13 according to FIG. 1a that decreases in steps from the infeed end 11 of the optical signals for the fiber 1 in the transmission direction $r_1$.

According to FIG. 1a, the concentration $k_z$ of the dopant is highest in a fiber section $1_1$ adjoining the end 11 of the fiber 1 and decreases in steps in successive sections $1_1$, $1_2$, ... from section to section until it reaches the lowest value in a last section $1_m$, wherein m is a selectable, natural whole number, and which section $1_m$ adjoins the opposite end 12 of the fiber for the outfeed of these optical signals $S_1$, $S_2$, ... $S_n$.

Expediently, the concentration $k_z$ of the dopant is selected constant in each of these fiber sections $1_1$, $1_2$, ... $1_m$ and it is beneficial, and not only for manufacturing reasons, to compose the fiber 1 of individual fiber sections $1_1$, $1_2$, ... $1_m$ that have their end faces coupled to one another. Given low concentrations $k_z$ of the dopant, it is only meaningful to utilize doped fiber sections where the pump emission still leads to a noticeable lowering of the attenuation of the fiber 1.

Given employment of $Er^{3+}$ as a dopant, the optimum $Er^{3+}$ doping of an amplified fiber 1 is dependent on a number of parameters. With a given $Er^{3+}$ concentration, there is an optimum fiber length that is still somewhat dependent on the pump wavelength, on the radial refractive index profile, on the radial profile of the $Er^{3+}$ doping, on the pump power as well as on the chemical composition of the fiber, for example on co-dopings. However, for a given fiber design, the product of the optimum length of the fiber and the $Er^{3+}$ concentration is approximately constant. According to an article by Emmanuel Desurvire et al entitled "Design Optimization for Efficient Erbium-Doped Fiber Amplifiers", *Journal of Light Wave Technology*, Vol. 8, No. 11, November 1990, page 730, typical values for the product of optimum length and $Er^{3+}$ concentration lie at 1 km$\times 10^{17}$/cm$^3$ through 1 km$\times 10^{18}$/cm$^3$. Given a pumped fiber distance of, for example, 100 km, this means that the $Er^{3+}$ concentration should lie in the range of $10^{15}$/cm$^3$ through $10^{16}$/cm$^3$. Since it is particularly relatively long fiber distance of, for example, 10 km through 100 km that are of interest within the framework of the present invention, the long pump wavelength should be selected at $\lambda = 1.47$ μm in order to keep the attenuation of the pump light on the fiber link as low as possible.

In the case of the profile 13 of FIG. 1a, the pump emission P is coupled into the fiber 1 proceeding from the opposite end 12 of the fiber 1 for outfeed of the optical signals $S_1$, $S_2$, ... $S_n$ and passes through the fiber opposite the transmission direction in the direction to the one end 11 of the fiber 1 for the infeed of the signals. As in all other instances, the infeed of the pump radiation P in the fiber 1 of FIG. 1 can also occur with an optical directional coupler, for example with a directional coupler 6 arranged between the opposite end 12 of the fiber 1 and the optical amplifier 6. This directional coupler 6 couples the pump radiation P generated by a laser 52 into the fiber 1.

Given uniform doping of the fiber 1 with the dopant, the optical amplification would also decrease in this direction, since the pump power of the pump radiation P decreases toward the end 11 of the fiber due to the attenuation of the fiber as it passes from the end 12 toward the end 11. However, since the concentration $k_z$ of the dopant, in fact, increases in this direction, the decrease of the optical amplification in this direction is converted into a decrease, is cancelled or at least weakened, this being inventively desired.

In FIG. 1d, a curve 1 shows the ideal case, wherein the signal level p of the infed signals $S_1$, $S_2$, ... $S_n$ is kept constant on the basis of a suitably selected profile 13 of the concentration $k_z$ of the dopant. The curve II shows the case wherein the signal level p, in fact, decreases when traversing the fiber 1 due to a less than ideally selected profile 13 but not to such an extent as in the case of the unpumped fiber 1 that does not have any amplifying effect and which is indicated by the curve III.

For compensation of the three-wave mixing that dominates as the limiting effect up to the channel numbers or carrier wave numbers n of approximately 300, the optimum profile 15 of the dispersion $dn_0/d\lambda$ of the fiber 1 shown in FIG. 1b, wherein $n_0$ is a refractive index of the fiber and $\lambda$ denotes the optical wavelength, can be employed. This profile 15 has a high value of dispersion $dn_0/d\lambda$ in an end section of the fiber adjoining the end 11 of the fiber for the infeed of the optical signals, this end section being approximately half of the length L/2 of this fiber 1. The dispersion $dn_0/d\lambda$ should likewise be high in the remaining part of the fiber, but should have the opposite operational sign in order to keep the dispersion effect low with respect to the signal distortion (transit time dispersion).

Instead of the fiber 1 of FIG. 1b, a fiber, which has a constant and optically high dispersion $dn_0/d\lambda$ over the entire length L of the fiber, can be advantageously employed and will have a constant profile 15 of this dispersion when a compensation fiber 201 having an extremely high dispersion $dn_1/d\lambda$ with an operation sign that is opposite in comparison to the dispersion $dn_0/d\lambda$ of the fiber 1. As illustrated in FIG. 1c, a negative operational sign indicated by the line 16 for the compensation fiber 201 precedes the end 11 of the fiber 1 or both ends.

The shorter length $L_1$ of the compensation fiber 201 in comparison to the length L of the fiber 1 and the amount $|dn_1/d\lambda|$ of the dispersion $dn_1/d|$ of the compensation fiber 201 that has one end 211 for infeeding the optical signals $S_1, S_2, \ldots S_n$ coupled to the output 40 of the coupler 4 and has an opposite end 212 for outfeed of these signals $S_1, S_2, \ldots S_n$ to the one end 11 of the fiber 1 are selected so that the overall dispersion of the fiber 1 and the compensation fiber 201 is less than the dispersion $dn_0/d\lambda$ of the fiber 1, and preferably is equal to zero.

The bidirectional transmission system shown in FIG. 2 differs from the transmission system of FIG. 1 in terms of the fiber 2 that comprises a different profile of the concentration $k_z$ of the dopant which is symmetrical with respect to the distances and differs therefrom in that both the optical signals $S_1, S_2, \ldots S_n$ as well as the pump emission P are infed into the fiber 2 at both ends 21 and 22 and the signals $S_1, S_2, \ldots S_n$ are received from both these ends 21 and 22. Additionally present for this purpose in comparison to the system of FIG. 1 are as follows:

n additional, separate optical transmitters 31; 32', . . . 3n' for generating the optical signals $S_1, S_2, \ldots S_n$ on the n carrier wavelengths $\lambda_1, \lambda_2, \ldots \lambda_n$;

an additional optical coupler 4' having n inputs 41', 42', . . . 4n' to which the signals $S_1, S_2, \ldots S_n$ are supplied and having one output 40' at which these signals $S_t, S_2, \ldots S_n$ are brought together and are then connected via an additional directional coupler 60, for example, by an additional compensation fiber 202 to the end 22 of the fiber 2 that corresponds to the end 12 of the fiber 1 in FIG. 1;

an additional optical amplifier 6', which is connected via a further, additional optical coupler 60' and, for example, via the compensation fiber 201 to the end 21 of the fiber 2 that corresponds to the end 11 of the fiber 1 in FIG. 1;

an additional optical distributor 7' having an input 70' connected by an additional optical filter 80' to the additional optical amplifier 6' and having n outputs 71', 72', . . . 7n' of which each is connected via a separate additional optical filter 81', 82', . . . 8n' to the respective, allocated optical receiver 91', 92', . . . 9n'; and a further additional optical directional coupler 51' for the infeed of, for example, the pump emission P generated by an additional pump laser 52' through the end 21 of the fiber 2, which corresponds to the end 11 of the fiber 1 in FIG. 1.

Each part of FIG. 2 provided with a reference character with a prime has the same function as the above-described part provided with a numerically same reference character without a prime. The additional compensation fiber 202, which has an end 222 connected to the end 22 of the fiber 2 and has its opposite end 221 connected to the direction couplers 51 and 60 is, likewise, identical to the compensation fiber 201 in function and structure.

It should be noted, given the bidirectionally operable transmission system of FIG. 2, that problems can occur due to reflections occurring at coupling locations or fiber ends. These reflections, given adequate optical amplification, even potentially leading to the fact that the entire system resonates as a laser. One must, therefore, take care to achieve low optical reflection at such locations, for example by anti-reflection coating, immersion of the end faces and/or oblique grinding of the end faces. It is additionally advantageous to decouple the optical transmitter preferably composed of laser transmitters at both sides of the fiber 2 with optical isolators 100, 100' or circulators as well.

The noise produced by the optical amplifiers 6 and 6', as well as the amplifying fiber 2, as a consequence of the spontaneous emission, can be limited by the use of the filters 80 and 80'.

The fiber 2 itself has the profile 14 with profile 13 of the concentration $k_z$ of the dopant that is shown in FIG. 2a. According to this profile 14 with profile 13, the concentration $k_z$ of the dopant increases in steps from the end 21 of the fiber 2 up to the middle L/2 of the fiber 2 and decreases in steps from this middle L/2 up to the opposite end 22.

For minimizing the effects of the three-wave mixing, the fiber 2 should have an optimally high dispersion, for example a dispersion having a profile 15 of FIG. 2b.

FIG. 2c qualitatively shows a profiles 15 of the fiber 2. Also, FIG. 2c shows profiles 216 and 226 of the compensation fibers 201 and 202, respectively.

In FIG. 2d, curve IV qualitatively shows the lowest drop of the signal level p of the infeed signals $S_1, S_2, \ldots S_n$ independent of the transmission direction $r_1$ or $r_2$ that can be achieved given bidirectional transmission and optimally selected profile of the concentration $k_z$ for the dopant. The curve V shows the drop of the signal level p that can be achieved with the profiles 13 and 14 of FIG. 2a, and this is not as great as in the case of an unpumped fiber which does not have an amplifying effect and which is indicated by the curve III.

FIG. 3 shows an alternative system wherein the doping of the optical fiber is constant along the transmission link and, instead, a plurality of sections are separately optically pumped. The illustrated pump arrangement is optimally designed for symmetrical, bidirectional transmission, since the entire transmission means is symmetrically designed with reference to the middle of the link.

Transmission systems with heterodyne receivers can be particularly advantageously realized with the fibers of the invention. Since higher receiver sensitivities are achieved, the noise of the optical amplifiers is limited by intermediate frequency filters, and extremely narrow channel spacings can be achieved due to the high separating power or reflectivity of the intermediate frequency filter.

Optimized transmission systems that can transmit a hundred channels or, respectively, carrier frequencies with data rates of 2.5 Gbits/s to 5 Gbits/s over a distance of at least 100 km through 200 km are possible within the system of the present invention. In particular, high-performance long-distance transmission links and submarine cables can be realized with the system of the present invention.

In summary, a transmission system has been set forth above that will enable an extremely high data throughput. The crucial items of this transmission equipment are, first, arrangements that enable an optimally constant, low signal level along the transmission link and, second, arrangements that keep the effective interaction length for the three-wave mixing as short as possible.

The demand for optimally constant power level can also be achieved by deattenuation of the fiber link with optical amplifiers, for example in the form of Er-doped fiber amplifiers. In the standard, known arrangements, optical amplifiers are typically inserted after, respectively, for example, 50 km through 100 km fiber distance in order to regenerate the signal levels. Given a typical fiber attenuation of 0.2 dB/km through 0.25 dB/km, this still results in a variation of the signal level by 10 dB through 25 dB on these line sections. The de-attenuation of the link is inventively achieved in that the transmission fiber itself is fashioned as part of the amplifiers. To that end, for example, the fiber is lightly doped with Er ions and is optically pumped. In the ideal case, the product of the concentration of the dopant and the optical pump power density along the transmission link should be selected so that the amplification or, respectively, the signal level is constant along the link.

When the pump power is infed from one end of the fiber link, for example from the transmission side of the transmission link, then it decreases along the link due to the absorption of the fiber. Consequently, the concentration of the doping must increase to the same extent along the propagation direction of the pump power such that the product of the pump power and doping is constant everywhere.

Alternatively, a transmission fiber having two coupled, light-carrying waveguides could be employed, whereby the optical data signal is guided in a doped and, thus, amplifying waveguide and the optical pump power is guided in a second, undoped waveguide and the coupling of the waveguide is varied along the transmission link so that a constant pump power is achieved in the preferably constantly doped, first waveguide for the data signal.

Since the manufacture of optical fibers having variable doping and variable coupling of two waveguides in longitudinal direction is technologically complicated, the ideal solution is approximated in the invention in that a plurality of fiber sections having different, but constant doping are cascaded or in that successive line sections having fibers of identical doping are pumped to different degrees.

Given bidirectional transmission of data signals via a transmission fiber, optimization according to this principle is fundamentally less effective. When the transmission link is symmetrically operated, for example identical data throughput (identical data rates, identical number of channels) in both transmission directions, the course of the doping or, respectively, the course of the pump power must be symmetrical with respect to the middle of the link.

The minimization of the affective interaction length for the three-wave mixing can be achieved in that, at least in the range of a high signal power level, a fiber having a high dispersion is employed so that the waves generated by the non-linearity no longer coherently superimpose. Since, on the other hand, a high dispersion given great transmission lengths would lead to inadmissible transit time distortions of the data signal and, thus, to a great restriction of the allowable data rate per channel, the overall dispersion of the transmission link, for example the integral of the dispersion over the entire fiber link, must be kept adequately low. This can be achieved in that the fiber having a positive dispersion is utilized over one part of the transmission link and a fiber having a negative dispersion is utilized over the rest of the link so that the overall dispersion of the link is adequately low. This compensation of the dispersion can also be achieved with a relatively short fiber having extremely high, opposite dispersion that precedes or follows the actual transmission fiber.

When the transmission link is not fully optimized with respect to the demand for optimally constant power level, so that the power levels greatly fluctuate along the transmission link, then care must be exercised to see that fibers having high dispersions are employed at least on link sections having a high signal power level.

Additional improvements are possible by employing optical heterodyne reception: the sensitivity enhancement of typical 10 db obtainable with this reception method can be utilized to further reduce the power level on the transmission link and, thus, to further reduce non-linear effects. In addition, the dispersion effects in the intermediate frequency part of the receiver can be electronically compensated by corresponding, oppositely directed dispersion.

Although various minor modifications may be suggested by those versed in the art, it should be understood that I wish to embody within the scope of the patent granted hereon all such modifications as reasonably and properly come within the scope of my contribution to the art.

I claim:

1. In an optical transmission system for the transmission of optical signals in wavelength-division multiplex on a plurality of neighboring optical carrier wavelengths over a distance of more than 10 km, said system comprising a transmission waveguide for the transmission of the optical signals being coupled into said transmission waveguide and an optical waveguide amplifier for increasing the signal levels of the optical signals transmitted on the transmission waveguide which levels drop off along the transmission waveguide due to attenuation, the improvements comprising the optical waveguide amplifier being continuously distributed essentially over the entire length of the transmission waveguide.

2. An optical transmission system according to claim 1, wherein the transmission waveguide is composed of a doped waveguide with a dopant for achieving an optical amplification in the transmission waveguide, said doped waveguide being excited by optical pumping with a pump emission, means for producing a pump emission and means for coupling the pump emission into said doped waveguide.

3. An optical transmission system according to claim 2, wherein the product of the concentration of the dopant and of the pump power density of the pump emission infed into the transmission waveguide and guided in the waveguide is essentially constant along the transmission waveguide.

4. An optical transmission system according to claim 3, wherein the concentration of the dopant comprises a drop selected from a continuous drop-off and a step-shaped drop-off in the transmission direction of the optical signal guided in the transmission waveguide and the pump emission in the region of this drop-off is guided in the transmission waveguide opposite to the transmission direction.

5. An optical transmission system according to claim 4, wherein the optical signals are unidirectional signals and wherein the concentration of the dopant drops from one end of the transmission waveguide for the infeed of the optical signals into the waveguide along the waveguide up to an opposite end of the waveguide for the outfeed of the optical signals that are guided through the waveguide and that the pump emission is fed into the waveguide through the opposite end for the outfeed of the optical signals and is guided through the Waveguide toward the one end for the infeed of the optical signals.

6. An optical transmission system according to claim 4, wherein the optical signals are bidirectional transmitted signals, the concentration of the dopant increases continuously or in steps from one end of the fiber for the infeed and outfeed of the optical signals up to the middle of the transmission waveguide and decreases continuously or in steps from the middle to the opposite end for the outfeed and infeed of the optical signals and the pump emission can be coupled into the waveguide both via the one end as well as via the opposite end and are guided in the waveguides in opposite directions.

7. An optical transmission system according to claim 4, wherein the transmission waveguide comprises a dopant profile with a step-shaped drop-off of the concentration of the dopant, said step-shaped drop-off is accomplished by a separate waveguide section being provided for each step of the dopant profile, the concentration of the dopant allocated to each step being constant in the separate waveguide section and in that the waveguide sections are coupled to one another at their end faces in accordance with the dopant profile of the concentration of the dopant.

8. An optical transmission system according to claim 1, wherein a pump emission is laterally coupled into the waveguide with constant or locally varying constant degrees over essentially the entire length of the transmission waveguide.

9. An optical transmission system according to claim 8, wherein the pump emission is guided in an undoped waveguide that is conducted along the transmission waveguide and is optically coupled to the transmission waveguide.

10. An optical transmission system according to claim 9, wherein the transmission waveguide has a constant concentration of the dopant and in that the coupling of the undoped waveguide to the transmission waveguide varies the transmission waveguide so that a pump power of the pump emission coupled into the transmission waveguide is constant in the transmission waveguide.

11. An optical transmission means according to claim 1, wherein a compensation waveguide having a dispersion having an operational sign which is opposite in comparison to an operational sign of a dispersion of the transmission waveguide is pre-connected to an end of the transmission waveguide for the infeed of the optical signals thereto, wherein the length of the compensation waveguide which is shorter in comparison to the length of the transmission waveguide and the dispersion with the opposite operational sign of the compensation waveguide is selected so that the overall dispersion of the transmission waveguide and of the compensation waveguide is less than the dispersion of the transmission waveguide.

12. An optical transmission system according to claim 1, wherein the transmission waveguide has two halves with a dispersion of one operational sign on one half and a dispersion with an opposite operational sign on the other half.

13. An optical transmission system according to claim 1, wherein the transmission waveguide is composed of a single optical fiber.

14. An optical transmission system according to claim 1, wherein the transmission waveguide is composed of a plurality of sections of optical fibers.

15. In an optical transmission system for the transmission of optical signals in wavelength-division multiplex on a plurality of neighboring optical carrier wavelengths over a distance of more than 10 km, said system comprising a transmission waveguide for the transmission of the optical signals being coupled into said transmission waveguide, and an optical amplifier for increasing the signal levels of the optical signals transmitted on the transmission waveguide, which signal levels drop off along the transmission waveguide due to attenuation, the improvements comprising said transmission waveguide having a dopant along the waveguide length for achieving an optical amplification of optical signals being transmitted therealong, said dopant being in different concentration at different positions along the transmission waveguide, said transmission waveguide being excited by optical pumping with a pump emission, means for coupling pump emissions into the transmission waveguide so that the optical amplifier extends the entire length of the transmission waveguide to amplify the signal levels during transmission along the entire length of the transmission waveguide.

16. In an optical transmission system according to claim 15, wherein the transmission waveguide is formed by a plurality of separate waveguide sections each having a different degree of dopant, said sections being connected end-to-end so that the concentration of the dopant in the transmission waveguide changes in a step-like manner.

* * * * *